(12) United States Patent
Van Der Goes et al.

(10) Patent No.: US 8,446,184 B2
(45) Date of Patent: May 21, 2013

(54) MODE DEPENDENT DRIVING OF THE CENTER TAP IN ETHERNET COMMUNICATIONS

(75) Inventors: Frank Van Der Goes, Bunnik (NL);
Christopher Ward, Zutphen (NL);
Ovidiu Bajdechi, San Jose, CA (US);
Erol Arslan, Bunnik (NL)

(73) Assignee: Broadcom Corporation, Irvine, CA (US)

( * ) Notice: Subject to any disclaimer, the term of this patent is extended or adjusted under 35 U.S.C. 154(b) by 227 days.

(21) Appl. No.: 12/855,432

(22) Filed: Aug. 12, 2010

(65) Prior Publication Data

US 2012/0038393 A1    Feb. 16, 2012

(51) Int. Cl.
*H03K 3/00*    (2006.01)

(52) U.S. Cl.
USPC ........................................................ 327/108

(58) Field of Classification Search
None
See application file for complete search history.

(56) References Cited

U.S. PATENT DOCUMENTS

| | | | | |
|---|---|---|---|---|
| 6,175,255 | B1* | 1/2001 | Mohan ............................ | 327/108 |
| 6,665,347 | B2* | 12/2003 | van Bavel et al. ............ | 375/257 |
| 6,665,399 | B1* | 12/2003 | Gorcea et al. ............ | 379/399.01 |
| 7,187,909 | B2* | 3/2007 | Lin et al. .......................... | 455/91 |
| 7,863,935 | B2* | 1/2011 | Kan et al. ......................... | 326/86 |
| 2007/0018624 | A1* | 1/2007 | Guo ................................ | 323/282 |
| 2007/0176584 | A1* | 8/2007 | Chen ............................. | 323/282 |
| 2009/0179624 | A1* | 7/2009 | Chen ............................. | 323/282 |
| 2009/0212829 | A1* | 8/2009 | Kan et al. ...................... | 327/108 |
| 2009/0237122 | A1* | 9/2009 | Wenske et al. ................ | 327/108 |
| 2009/0289721 | A1* | 11/2009 | Rajendran et al. ............ | 330/301 |
| 2011/0068831 | A1* | 3/2011 | Li et al. ......................... | 327/108 |
| 2011/0075741 | A1* | 3/2011 | Li et al. ......................... | 375/258 |

* cited by examiner

*Primary Examiner* — Lincoln Donovan
*Assistant Examiner* — Khareem E Almo
(74) *Attorney, Agent, or Firm* — Sterne, Kessler, Goldstein & Fox P.L.L.C.

(57) ABSTRACT

An output stage comprising a current mode line driver, a voltage mode line driver, and a center-tapped transformer for coupling data provided by the line drivers to a transmission line is provided herein. The output stage is configured to operate in a backwards compatible Ethernet communication device. For example, the Ethernet communication device is configured to support 10G Ethernet and legacy Ethernet modes of 10BASE-T, 100BASE-T, and 1000BASE-T. The current mode line driver can be utilized while operating in the 10G Ethernet mode to provide high linearity. The voltage mode line driver can be utilized while operating in legacy mode to conserve power. In order to accommodate the use of two different line drivers, a switch and/or a voltage regulator is used to couple/decouple a dc voltage to a center-tap of the transformer based on which of the two different line drivers is currently active.

21 Claims, 4 Drawing Sheets

MODE DEPENDENT DRIVING OF THE CENTER TAP IN ETHERNET COMMUNICATIONS

FIELD OF THE INVENTION

This application relates generally to line drivers and more particularly to line drivers for Ethernet applications.

BACKGROUND

Communication devices are often required to be backwards compatible with devices that operate in accordance with older communication protocols. Specifically, a communication device, designed for a new communication protocol, is said to be backwards compatible if it is capable of sending and receiving data formatted in accordance with older communication protocols. Mandating or designing new communication devices to be backwards compatible allows networks to be gradually and/or smoothly transitioned to new communication protocols.

Ethernet communication devices are one particular type of communication device often required to be backwards compatible. In fact, the Institute of Electrical and Electronics Engineers (IEEE) generally mandates that all Ethernet compliant devices be backwards compatible with older versions of the Ethernet standard. For example, an Ethernet communication device may support several different Ethernet standards, including 10BASE-T (10 Mbit/s), 100BASE-T (100 Mbits/s), 1000BASE-T (1 Gbit/s), 10 Gigabit Ethernet (10 Gbit/s), and 100 Gigabit Ethernet (100 Gbit/s).

Conventional approaches for providing a communication device compliant with both the latest Ethernet standard(s) (e.g., 10 and/or 100 Gigabit Ethernet) and legacy Ethernet standards commonly use a single, current-mode digital-to-analog converter (DAC) for driving transmission lines. While a current-mode DAC provides excellent linearity capable of meeting the stringent requirements of the 10 and 100 Gigabit Ethernet standards, the high linearity comes at a cost of power consumption. Because slower, legacy Ethernet standards do not require such high linearity, power is generally wasted when the communication device is operating in legacy mode.

Therefore, what is needed is an apparatus for increasing power efficiency of backwards compatible communication devices, such as Ethernet communication devices, when operating in legacy mode.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
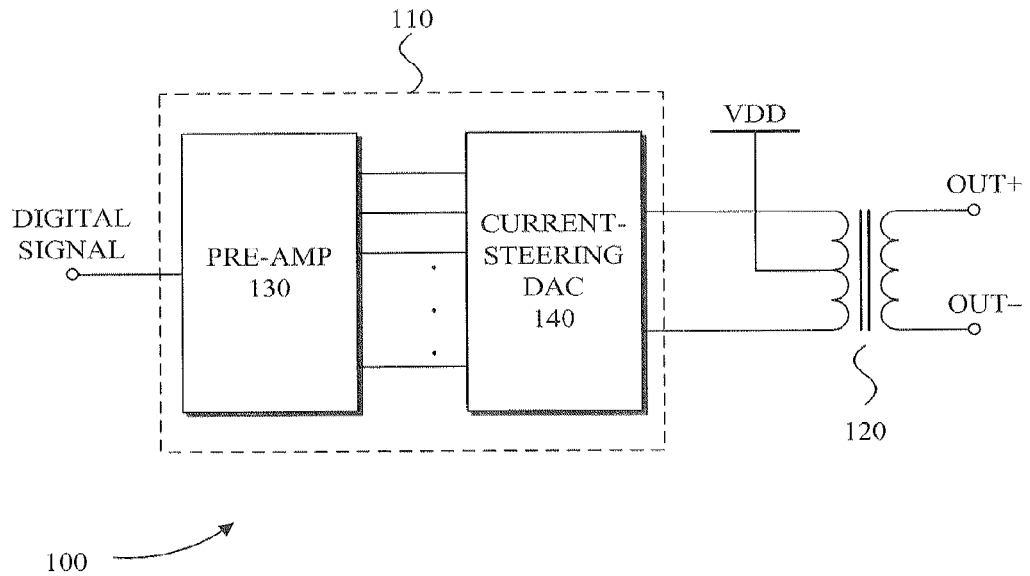
FIG. 1 illustrates an output stage for a communication device that includes a single line-driver, according to embodiments of the present invention.

FIG. 1 illustrates an output stage 100 of a communications device, according to embodiments of the present invention. In an embodiment, output stage 100 is implemented within an Ethernet communications device configured to support 10 Gigabit Ethernet and legacy Ethernet modes of 10BASE-T (10 Mbit/s), 100BASE-T (100 Mbits/s), and 1000BASE-T (1 Gbit/s), for example. The output stage 100 includes a single, current-mode line driver 110 configured to support multiple communication standards, such as the Ethernet standards noted above, and a center-tapped transformer 120. In general, a line driver is an amplifier that is configured to increase the strength of a received analog or digital signal to be transmitted by driving a transmission line with the received signal at a higher than normal signal level. This increases the transmission quality of the signal over the length of the cable, allowing the signal to be properly received by a device on the other end.

In operation, current-mode line driver 110 is configured to receive a digital input signal to be transmitted and to provide a differential analog output signal corresponding to the received digital input signal. Current-mode line driver 110 specifically provides the differential analog output signal to a primary side of transformer 120 at the appropriate signaling levels and output power dictated by the current communication standard in operation. Sufficient output power is needed to drive transmission lines (e.g., unshielded twisted pair lines, optical fiber, etc.) of a predetermined maximum length that are coupled to differential output nodes OUT+ and OUT- at the secondary side of transformer 120 and to overcome noise introduced during transmission. Transformer 120 aids in the rejection of common-mode signals present at the output of line driver 110 and provides dc isolation between the output of line driver 110 and the load presented by the transmission lines coupled to differential output nodes OUT+ and OUT−.

As further illustrated in FIG. 1, line driver 110 includes a pre-amp 130 and a current-steering digital-to-analog converter (DAC) 140. Pre-amp 130 is optionally included in line driver 110 to provide, for example, signal amplification and/or conditioning of one or more of the digital bits in the received digital signal before the digital signal is passed to current-steering DAC 140. Current-steering DAC 140 includes a plurality of segments (not shown) for steering current to either the positive or negative end of the primary side of transformer 120 based on the digital signal received.

In general, there are two types of current-steering DACs: those with current source outputs and those with current sink outputs. The current-steering DACs with current source outputs inject current into an external load, while the current-steering DACs with current sink outputs draw current from an external load. In the embodiment illustrated in FIG. 1, current-steering DAC 140 includes current sink outputs that draw current from the center-tap of transformer 120. Thus, the center-tap of transformer 120 is coupled to a positive voltage supply VDD. In an alternative embodiment, current-steering DAC 140 includes current source outputs and the center-tap of transformer 120 is coupled to a voltage supply of ground potential (i.e., VDD=0 volts).

Current-steering DAC 140 is configured as a class-A amplifier, which provides a good compromise between power consumption and linearity; in other words, current-steering DAC 140 provides adequate linearity to meet the stringent requirements of the 10G Ethernet standard, for example, while consuming an acceptable amount of power. However, when output stage 100 is operating in legacy mode (e.g., in 10BASE-T, 100BASE-T, or 1000BASE-T) the linearity provided by current-steering DAC 140 is generally much higher than what is required. Because lower levels of linearity are often acceptable while operating in these legacy modes, other, more power efficient types of line drivers can be beneficially utilized (although with reduced linearity).

For example, a voltage-mode line driver configured as a class-AB amplifier can be used in place of current-mode line driver 110 to increase power-efficiency, while operating in a legacy mode. However, voltage-mode line drivers require the center-tap voltage of transformer 120 to be floating in most instances, as opposed to being fixed at a positive voltage supply value of VDD for current-steering DAC 140 (or at ground potential for a current-steering DAC with current source outputs). Therefore, what is needed is an output stage for a communication device, such as an Ethernet communication device, that includes a transformer with a mode dependent center tap voltage.

Figure 2:
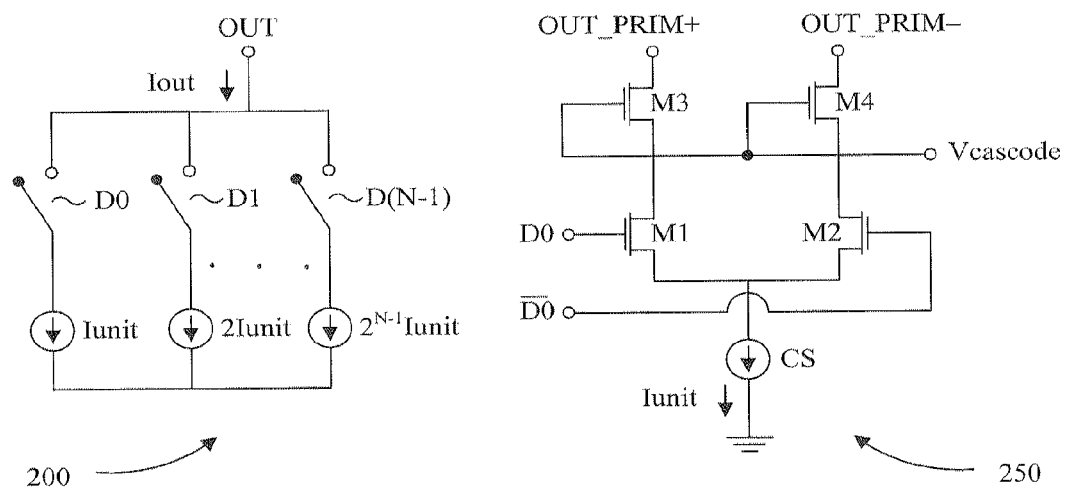
FIG. 2 illustrates a high-level circuit structure for a current-steering DAC and current-steering DAC segment, according to embodiments of the present invention.

FIG. 2 illustrates a high-level circuit structure 200 for a current-steering DAC and a current-steering DAC segment 250, according to embodiments of the present invention. High-level circuit structure 200 and current-steering DAC segment 250 represent one potential implementation for current-steering DAC 140, illustrated in FIG. 1.

As illustrated in FIG. 2, high-level circuit structure 200 is for a single-ended, N-bit binary weighted current-steering DAC. High-level circuit structure 200 includes N binary weighted current sources that are selectively coupled to output node OUT by N switches. The N switches are controlled by a digital signal that includes N digital bits D0-D(N−1). In an embodiment, unit current sources can be used to form each current source illustrated in high-level circuit structure 200 (i.e., Iunit, 2Iunit, etc.) to improve matching.

Each switch/current source pair of high-level circuit 200 is formed by one or more current-steering DAC segments. A more detailed current-steering DAC segment 250, for a differential current-steering DAC, is further illustrated in FIG. 2. As illustrated, current-steering DAC segment 250 includes a bias current source CS that provides current Iunit, a pair of differential field effect transistors (FETs) M1 and M2, and cascode FETs M3 and M4. In an embodiment, current source CS is further implemented using one or more FETs.

The gates of cascode FETs M3 and M4 are coupled to control voltage Vcascode, and the drains of cascode FETs M3 and M4 are respectively coupled to output nodes OUT_PRIM+ and OUT_PRIM−, which represent the two ends of the primary side of transformer 120. The sources of cascode FETs M3 and M4 are respectively coupled to the drains of differential FET pair M1 and M2. The gates of differential FET pair M1 and M2 are respectively coupled to control signals D0 and $\overline{D0}$, which cause the differential FET pair M1 and M2 to steer the bias current Iunit to either the positive output node or the negative output node coupled to the primary side of transformer 120, illustrated in FIG. 1. For example, if control signal D0 is logic high and control signal $\overline{D0}$ is logic low, then FET M1 is turned "on" and FET M2 is turned "off" and the current Iunit is steered to the positive output node of the primary side of transformer 120. On the other hand, if control signal D0 is logic low and control signal $\overline{D0}$ is logic high, then FET M1 is turned "off" and FET M2 is turned "on" and the current Iunit is steered to the negative output node of the primary side of transformer 120.

It should be noted that exemplary high-level circuit structure 200 and current-steering DAC segment 250 illustrated in FIG. 2 are provided for the purpose of illustration and not limitation. Other equivalent implementations and/or variations of high-level circuit structure 200 and current-steering DAC segment 250 are possible as would be understood by a person skilled in the art based on the teachings herein. Equivalent implementations and/or variations may include, for example, variations in transistor type (e.g., PNP, BJT, JFET, BiCMOS etc.) and variations in current-steering DAC configuration (i.e., current-source outputs).

Figure 3:
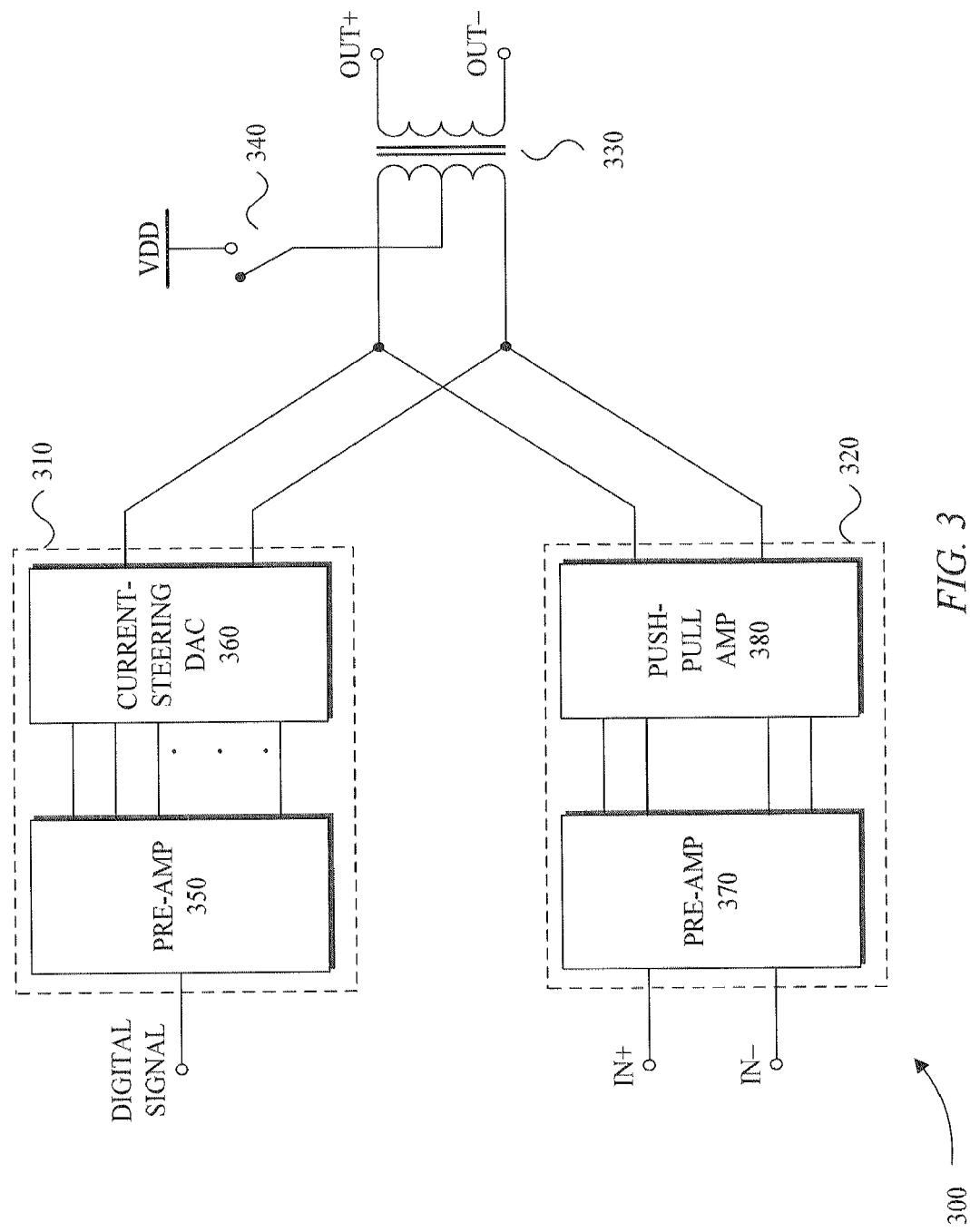
FIG. 3 illustrates an output stage for a communication device that includes multiple line-drivers and a transformer with a mode dependent center tap voltage, according to embodiments of the present invention.

Referring now to FIG. 3. FIG. 3 illustrates an output stage 300 for a communication device that includes multiple line drivers 310 and 320, a transformer 330 with a mode dependent center tap voltage, and a switch 340, according to embodiments of the present invention. In an embodiment, output stage 300 is implemented within an Ethernet communications device configured to support 10 Gigabit Ethernet and legacy Ethernet modes of 10BASE-T (10 Mbit/s), 100BASE-T (100 Mbits/s), and 1000BASE-T (1 Gbit/s), for example. In general, a line driver is an amplifier that is configured to increase the strength of a received analog or digital signal to be transmitted by driving a transmission line with the received signal at a higher than not normal signal level. This increases the transmission quality of the signal over the length of the cable, allowing the signal to be properly received by the device on the other end of the cable.

In the embodiment of FIG. 3, line driver 310 is configured as a current mode line driver and line driver 320 is configured as a voltage mode line driver. Current mode line driver 310 can be, for example, implemented and configured in the same manner as current mode line driver 110, described above in regard to FIG. 1. It should be noted that other types of line drivers, besides current mode and voltage mode line drivers, can be used without departing from the scope and spirit of the present invention. In general, the combination of any two or more types of line drivers within a single output stage that can benefit from a transformer with a mode dependent center tap voltage is contemplated as being within the scope and spirit of the present invention.

In operation, current-mode line driver 310 is configured to receive a digital input signal to be transmitted and to provide a differential analog output signal corresponding to the received digital input signal. Current-mode line driver 310 specifically provides the differential analog output signal to a primary side of transformer 330 at the appropriate signaling levels and output power dictated by the current communication standard in operation. Sufficient output power is needed to drive transmission lines (e.g., unshielded twisted pair lines, optical fiber, etc.) of a predetermined maximum length coupled to differential output nodes OUT+ and OUT− at the secondary side of transformer 330 and to overcome noise introduced during transmission. Transformer 330 aids in the rejection of common-mode signals present at the output of line driver 310 and provides dc isolation between the output of line driver 310 and the load presented by the transmission lines coupled to differential output nodes OUT+ and OUT−.

As further illustrated in FIG. 3, line driver 310 includes a pre-amp 350 and a current-steering digital-to-analog converter (DAC) 360. Pre-amp 350 is optionally included in line driver 310 to provide, for example, signal amplification and/or conditioning of one or more of the digital bits in the received digital signal before the digital signal is passed to current-steering DAC 360. Current-steering DAC 360 includes a plurality of segments (not shown) for steering current to either the positive or negative end of the primary side of transformer 330 based on the digital signal received.

As noted above in regard to FIG. 1, there are two types of current-steering DACs: those with current source outputs and those with current sink outputs. The current-steering DACs with current source outputs inject current into an external load, while the current-steering DACs with current sink outputs draw current from an external load. In the embodiment illustrated in FIG. 3, current-steering DAC 360 includes current sink outputs that draw current from the center-tap of transformer 330. Thus, the center-tap of transformer 330 is coupled to a positive voltage supply VDD when line driver 310 is active. In an alternative embodiment, current-steering DAC 360 includes current source outputs and the center-tap of transformer 330 is coupled to a voltage supply of ground potential (i.e., VDD=0 volts) when line driver 310 is active.

Current-steering DAC 360 is configured as a class-A amplifier, which, as further noted above in regard to FIG. 1, provides a good compromise between power consumption and linearity; in other words, current-steering DAC 360 provides adequate linearity to meet the stringent requirements of the 10G Ethernet standard, for example, while consuming an acceptable amount of power. However, when output stage 300 is operating in legacy mode (e.g., in 10BASE-T, 100BASE-T, or 1000BASE-T) the linearity provided by current-steering DAC 360 is generally much higher than what is required. Because lower levels of linearity are often acceptable while operating in these legacy modes, other, more power efficient types of line drivers can be beneficially utilized (although with reduced linearity).

For example, voltage-mode line driver 320 is configured as a class-AB amplifier can be used in place of current mode line driver 310 to increase power-efficiency, while operating in a legacy mode. More specifically, current mode line driver 310 can be used when operating in a 10G Ethernet mode and voltage mode line driver 320 can be used when operating in legacy mode (e.g., 10BASE-T (10 Mbit/s), 100BASE-T (100 Mbits/s), and 1000BASE-T (1 Gbit/s)). However, voltage mode line drivers, such as voltage mode line driver 320, require the center-tap voltage of transformer 330 to be floating in most instances, as opposed to being fixed at a positive voltage supply value for current-steering DAC 360 (or at ground potential for a current-steering DAC with current source outputs). In general, line driver 320 includes an optional pre-amp 370 for providing signal amplification and/or conditioning of the analog signal received at differential input nodes IN+ and IN−, and a push-pull amplifier 380. Push-pull amplifier 380 can be a class-AB amplifier that is not as linear as current-steering DAC 360, but is more power efficient.

Switch 340 is configured to couple/decouple the voltage supply VDD to and from the center-tap of transformer 330 based on which of the two line drivers, line driver 310 and line driver 320, is active. For example, if output stage 300 is operating in 10G Ethernet mode, line driver 310 will be activated and line driver 320 will deactivated, while switch 340 will couple the voltage supply VDD to the center-tap of transformer 330 (i.e., switch 340 is closed). Conversely, if output stage 300 is operating in a legacy Ethernet mode (e.g., 10BASE-T (10 Mbit/s), 100BASE-T (100 Mbits/s), and 1000BASE-T (1 Gbit/s)), line driver 320 will be activated and line driver 310 will deactivated, while switch 340 will decouple the voltage supply VDD from the center-tap of transformer 330 (i.e., switch 340 is opened), allowing it to float.

Figure 4:
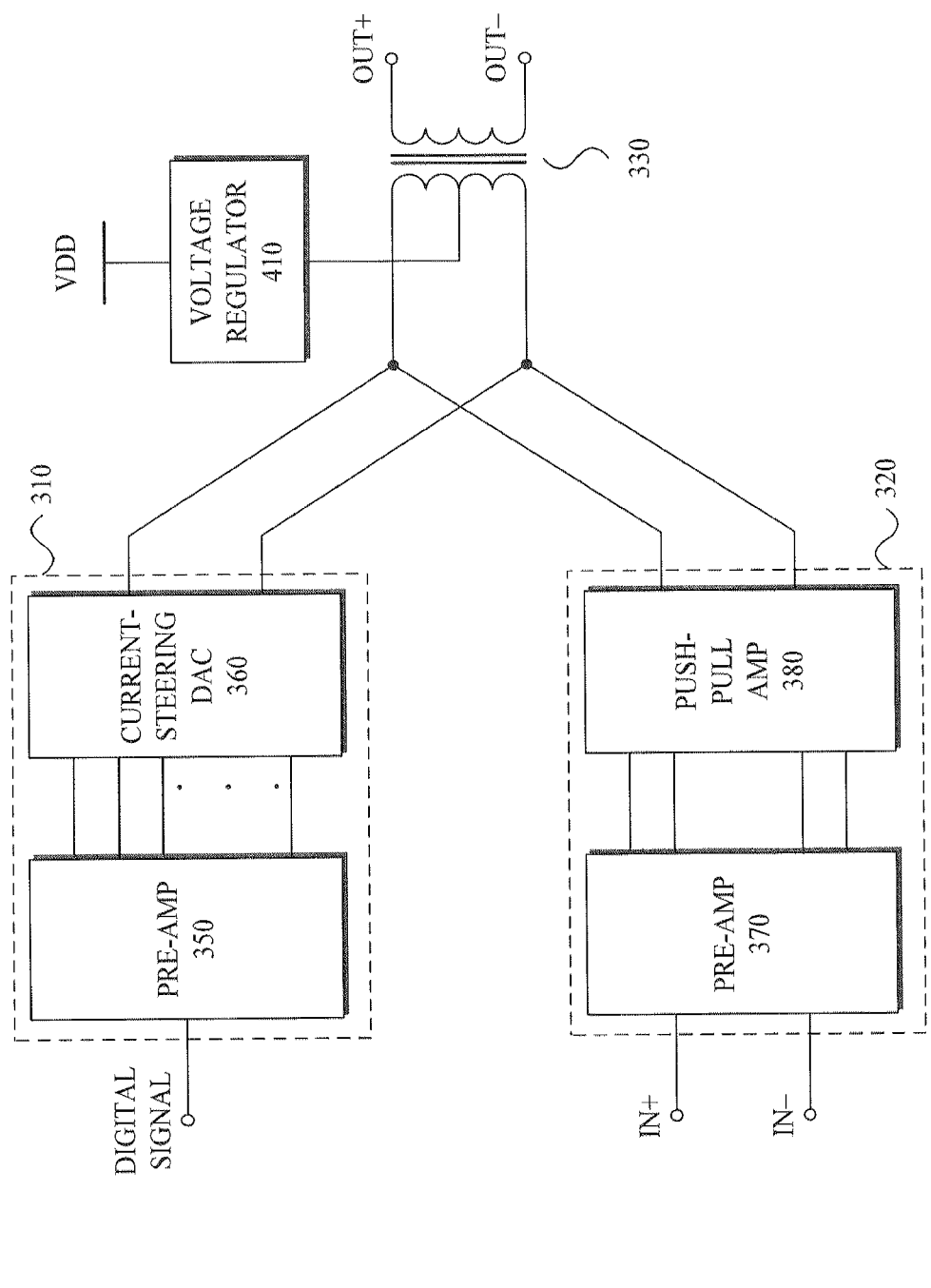
FIG. 4 illustrates an output stage for a communication device that includes multiple line-drivers and a transformer with a mode dependent and cable length dependent center tap voltage, according to embodiments of the present invention.

FIG. 4 illustrates an output stage 400 for a communication device that includes multiple line-drivers and a transformer with a mode dependent and cable length dependent center tap voltage, according to embodiments of the present invention. Output stage 400 has a substantially similar structure and operating configuration as output stage 300, illustrated in FIG. 3. However, switch 340 has been replaced by a voltage regulator 410.

In an embodiment, voltage regulator 410 is a switching regulator (e.g., buck, boost, or buck-boost regulator). Voltage regulator 410 is configured to couple a positive voltage to the center-tap of transformer 330 when output stage 400 is operating in 10G Ethernet mode, for example, and line driver 310 is active. However, as opposed to simple switch 340, illustrated in FIG. 4, voltage regulator 410 is further configured to vary the magnitude of the positive voltage coupled to the center-tap of transformer 330 when output stage 400 is operating in 10G Ethernet mode and line driver 310 is active.

In one embodiment, voltage regulator 410 is configured to increase/decrease the positive voltage coupled to the center-tap of transformer 330 based on a length of the transmission line(s) (e.g., unshielded twisted pair lines, optical fiber, etc.) coupled to output nodes OUT+ and OUT− of the secondary side of transformer 330. For example, for shorter transmission line lengths, the positive voltage coupled to the center-tap of transformer 330 can be reduced by voltage regulator 410 and for longer transmission line lengths the positive voltage coupled to the center-tap of transformer 330 can be increased by voltage regulator 410. By reducing the positive voltage coupled to the center-tap of transformer 330 to at or near the minimum voltage required to properly drive a transmission line of a given length, the power efficiency of output stage 400 can be further increased.

In another embodiment, voltage regulator 410 is configured to increase/decrease the positive voltage coupled to the center-tap of transformer 330 based on an attenuation characteristic of the transmission line(s) (e.g., unshielded twisted pair lines, optical fiber, etc.) coupled to output nodes OUT+ and OUT− of the secondary side of transformer 330. For example, for transmission lines with smaller attenuation properties, the positive voltage coupled to the center-tap of transformer 330 can be reduced by voltage regulator 410 and for transmission lines with larger attenuation properties the positive voltage coupled to the center-tap of transformer 330 can be increased by voltage regulator 410. By reducing the positive voltage coupled to the center-tap of transformer 330 to at or near the minimum voltage required to properly drive a transmission line of a given attenuation characteristic, the power efficiency of output stage 400 can be further increased.

Figure 5:
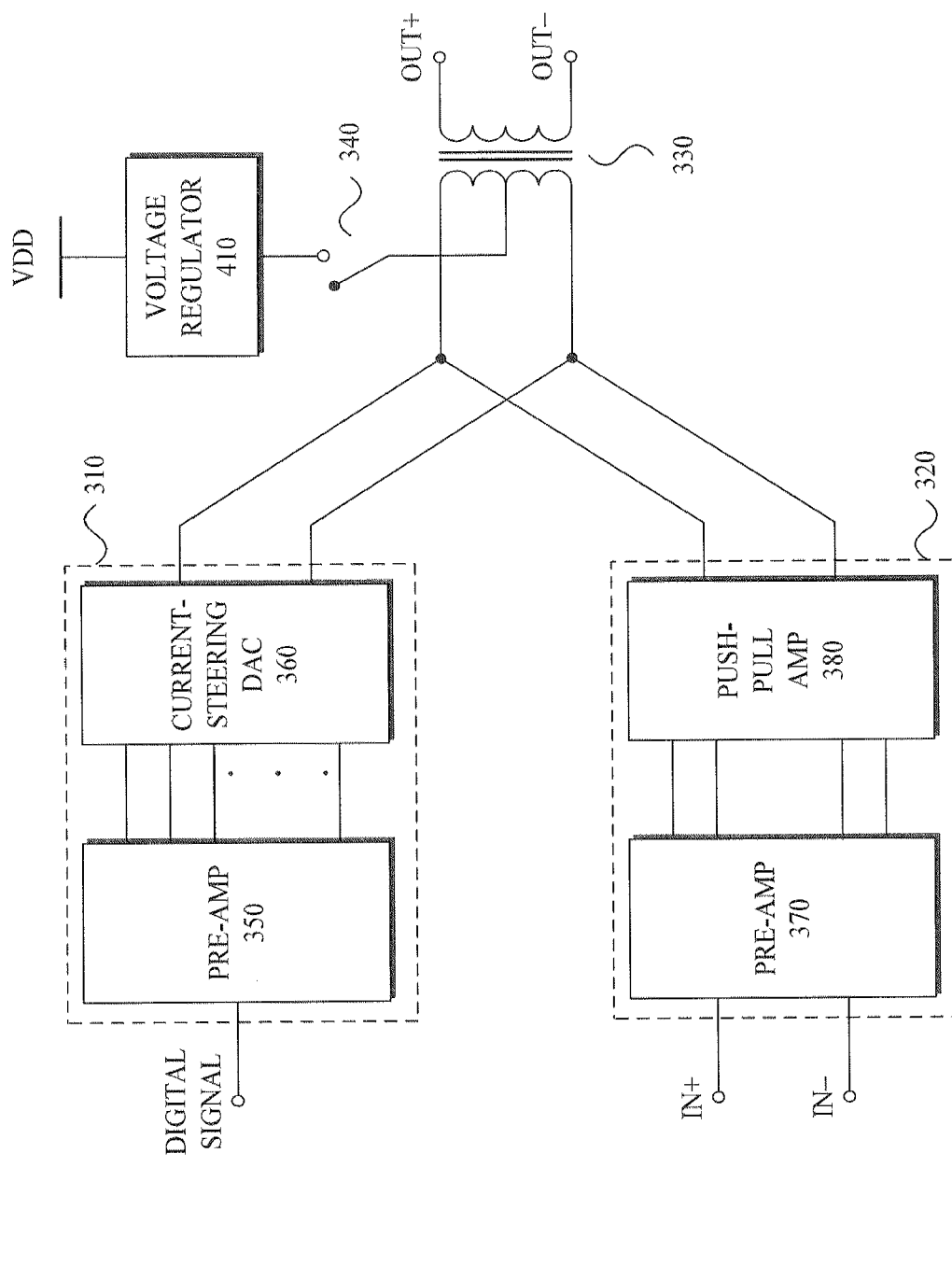
FIG. 5 illustrates a variation of the output stage, illustrated in FIG. 4, for a communication device that includes multiple line-drivers and a transformer with a mode dependent and cable length dependent center tap voltage, according to embodiments of the present invention.

When output stage 400 is operating in a legacy Ethernet mode (e.g., 10BASE-T (10 Mbit/s), 100BASE-T (100 Mbits/s), and 1000BASE-T (1 Gbit/s)), line driver 320 will be activated and line driver 310 will deactivated, while voltage regulator 410 can be powered down to allow the center-tap of transformer 330 to float. Alternatively, as illustrated in output stage 500 of FIG. 5, switch 340 can be reinstalled between voltage regulator 410 and transformer 330 to allow the center-tap of transformer 330 to float when operating in a legacy Ethernet mode.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An output stage, comprising:
    a current mode line driver configured to provide a first output signal in compliance with a first communication standard to a transformer;
    a voltage mode line driver configured to provide a second output signal in compliance with a second communication standard to the transformer; and
    a switch configured to switchably couple a dc voltage to a center-tap of the transformer based on which of the current mode line driver and the voltage mode line driver is active, wherein the switch is configured to decouple the dc voltage from the center-tap of the transformer when the voltage mode line driver is active, thereby allowing a voltage of the center-tap to float.

2. The output stage of claim 1, wherein the current mode line driver comprises a current-output digital-to-analog converter (DAC).

3. The output stage of claim 2, wherein the current-output DAC is a current-steering DAC.

4. The output stage of claim 2, wherein the current-output DAC comprises a current-source output that is configured to provide the first output signal.

5. The output stage of claim 4, wherein the switch is configured to couple the dc voltage to the center-tap of the transformer if the current mode line driver is active, wherein the dc voltage is a positive dc voltage value.

6. The output stage of claim 2, wherein the current-output DAC comprises a current-sink output that is configured to provide the first output signal.

7. The output stage of claim 6, wherein the switch is configured to couple the dc voltage to the center-tap of the transformer if the current mode line driver is active, wherein the dc voltage is ground.

8. The output stage of claim 2, wherein the first communication standard is a 10 Gigabit Ethernet communication standard.

9. The output stage of claim 1, wherein the voltage mode line driver comprises a push-pull amplifier.

10. The output stage of claim 9, wherein the second communication standard is at least one of a 1000BASE-T communication standard, a 100BASE-T communication standard, and a 10BASE-T communication standard.

11. The output stage of claim 1, wherein the second communication standard is a legacy standard.

12. An output stage, comprising:
    a current mode line driver configured to provide a first output signal in compliance with a first communication standard to a primary side of a transformer;
    a voltage mode line driver configured to provide a second output signal in compliance with a second communication standard to the primary side of the transformer; and
    a voltage regulator configured to switchably couple a dc voltage to a center-tap of the transformer based on which of the current mode line driver and the voltage mode line driver is active, wherein the voltage regulator is configured to power down when the voltage mode line driver is active, thereby allowing the center-tap voltage to float.

13. The output stage of claim 12, wherein the current mode line driver comprises a current-output digital-to-analog converter (DAC).

14. The output stage of claim 13, wherein the current-output DAC is a current-steering DAC.

15. The output stage of claim 13, wherein the voltage regulator is configured to couple the dc voltage to the center-tap of the transformer if the current mode line driver is active, wherein the dc voltage is a positive dc voltage value.

16. The output stage of claim 15, wherein the voltage regulator is configured to adjust the dc voltage coupled to the center-tap of the transformer based on the length of a cable attached to a secondary side of the transformer.

17. The output stage of claim 16, wherein the voltage regulator is configured to decrease the dc voltage coupled to the center-tap of the transformer as the cable decreases in length.

18. The output stage of claim 12, wherein the first communication standard is a 10 Gigabit Ethernet communication standard.

19. The output stage of claim 12, wherein the voltage mode line driver comprises a push-pull amplifier.

20. The output stage of claim 19, wherein the second communication standard is at least one of a 1000BASE-T communication standard, a 100BASE-T communication standard, and a 10BASE-T communication standard.

21. An output stage for a backwards compatible Ethernet communications device, comprising:
   a current mode line driver configured to provide a first output signal in compliance with a first Ethernet communication standard to a transformer;
   a voltage mode line driver configured to provide a second output signal in compliance with a second Ethernet communication standard to the transformer; and
   a switch configured to switchably couple a dc voltage to a center-tap of the transformer based on which of the current mode line driver and the voltage mode line driver is active, wherein the switch is configured to decouple the dc voltage from the center-tap of the transformer when the voltage mode line driver is active, thereby allowing a voltage of the center-tap to float.

* * * * *